(12) United States Patent
Thomas

(10) Patent No.: US 9,515,952 B2
(45) Date of Patent: Dec. 6, 2016

(54) METHOD OF AND SYSTEM FOR MANAGING COMPUTING RESOURCES

(75) Inventor: Jeffery Darrel Thomas, Plano, TX (US)

(73) Assignee: Hewlett Packard Enterprise Development LP, Houston, TX (US)

(*) Notice: Subject to any disclaimer, the term of this patent is extended or adjusted under 35 U.S.C. 154(b) by 171 days.

(21) Appl. No.: 14/129,459

(22) PCT Filed: Jul. 1, 2011

(86) PCT No.: PCT/US2011/042806
§ 371 (c)(1),
(2), (4) Date: Feb. 11, 2014

(87) PCT Pub. No.: WO2013/006157
PCT Pub. Date: Jan. 10, 2013

(65) Prior Publication Data
US 2014/0310401 A1    Oct. 16, 2014

(51) Int. Cl.
*G06F 15/173*    (2006.01)
*H04L 12/911*    (2013.01)
(Continued)

(52) U.S. Cl.
CPC ............... *H04L 47/70* (2013.01); *G06F 9/50* (2013.01); *H04L 41/5003* (2013.01);
(Continued)

(58) Field of Classification Search
CPC .. H04L 41/5009; H04L 41/5025; H04L 47/70; H04L 43/0876; H04L 41/5003; G06F 11/3003; G06F 9/50
(Continued)

(56) References Cited

U.S. PATENT DOCUMENTS 7,000,100 B2    2/2006    Lacombe et al.
7,283,935 B1    10/2007   Pritchard et al.
(Continued)

FOREIGN PATENT DOCUMENTS

CN    1645815 A    7/2005
CN    1902588      1/2007
(Continued)

OTHER PUBLICATIONS

International Searching Authority, International Search Report and Written Opinion, PCT/US2011/042806, 9 pages, Apr. 6, 2012.
(Continued)

*Primary Examiner* — Hieu Hoang
(74) *Attorney, Agent, or Firm* — Hewlett Packard Enterprise Patent Department

(57) ABSTRACT

According to one example of the present invention there is provided a method of managing a set of computing resources accessible to a client via a network. The method comprises monitoring computing resources of the set of computing resources and managing the computing resources in accordance with a set of computing resource guidelines. The method further comprises generating, based on the steps of monitoring and managing, a computer resource configuration change request, the request identifying a computing resource, identifying, from the identified computing resource, a client associated with the resource, determining whether the requested configuration change request is compatible with a client service level agreement, SLA, associated with the identified client; and, where it is so determined, authorizing the requested configuration change request to be made.

11 Claims, 4 Drawing Sheets

(51) Int. Cl.
*G06F 9/50* (2006.01)
*H04L 12/26* (2006.01)
*G06F 11/30* (2006.01)
*H04L 12/24* (2006.01)
*G06F 11/34* (2006.01)

(52) U.S. Cl.
CPC ...... *H04L 43/0876* (2013.01); *G06F 11/3003* (2013.01); *G06F 11/3409* (2013.01); *H04L 41/5009* (2013.01); *Y02B 60/142* (2013.01); *Y02B 60/165* (2013.01)

(58) Field of Classification Search
USPC .................................................. 709/223, 224
See application file for complete search history.

(56) References Cited

U.S. PATENT DOCUMENTS

| | | | |
|---|---|---|---|
| 7,565,416 B1* | 7/2009 | Shafer | H04L 41/0813 709/203 |
| 7,644,410 B1 | 1/2010 | Graupner et al. | |
| 7,734,765 B2 | 6/2010 | Musman et al. | |
| 8,307,362 B1* | 11/2012 | Gong | G06F 9/5077 718/1 |
| 8,898,402 B1* | 11/2014 | Stronge | G06F 3/0605 711/100 |
| 2004/0221038 A1* | 11/2004 | Clarke, Jr. | G06F 9/5072 709/226 |
| 2006/0227810 A1 | 10/2006 | Childress et al. | |
| 2007/0174840 A1 | 7/2007 | Sharmar et al. | |
| 2009/0055427 A1* | 2/2009 | Kulasingam | H04L 41/5006 |
| 2009/0133026 A1* | 5/2009 | Aggarwal | G06F 9/4843 718/103 |
| 2010/0083145 A1 | 4/2010 | Schang et al. | |
| 2010/0319004 A1* | 12/2010 | Hudson | G06F 9/5072 719/313 |
| 2011/0022697 A1 | 1/2011 | Huh | |
| 2011/0041126 A1 | 2/2011 | Levy | |
| 2011/0296019 A1* | 12/2011 | Ferris | G06F 9/45533 709/226 |
| 2013/0346584 A1* | 12/2013 | Tameshige | G06F 9/5077 709/223 |

FOREIGN PATENT DOCUMENTS

| | | |
|---|---|---|
| CN | 1954289 A | 4/2007 |
| KR | 20090059851 A | 6/2009 |

OTHER PUBLICATIONS

"Service Level Management," ITIL Open Guide, Jun. 27, 2011,<http://web.archive.org/web/20110627222828/http://www.itlibrary.org/index.php?page=Service_Level_Management>.

Cisco, "Service Level Management: Best Practices White Paper," Oct. 4, 2005,<http://www.cisco.com/c/en/us/support/docs/availability/high-availability/15117-sla.html>.

Extended European Search Report; Mailed Aug. 20, 2015; European Patent Office.

ITSM Solutions, "A 5-Step Process for Defining IT Services," Mar. 11, 2008,<http://www.itsmsolutions.com/newsletters/DITYvol4iss11.htm>.

Margaret Rouse, "Service-level management," May 2007, TechTarget,<http://searchsoa.techtarget.com/definition/service-level-management>.

MITSM, "Service Level Agreement Management," May 10, 2008,<https://www.mitsm.de/service-level-agreement-management-en>.

MyCloudWatcher, "myCloudWatcher—Service Description," Oct. 5, 2010,<http://mycloudwatcher.com/?q=node/24>.

Webopedia Computer Dictionary, "watchdog," Jul. 13, 2010,<http://web.archive.org/web/20100713192100/http://www.webopedia.com/TERM/w/watchdog.html>.

Wikipedia, "Business Process Framework (eTOM)," Jan. 20, 2011,<https://en.wikipedia.org/w/index.php?title=Business_Process_framework_(eTOM)&oldid=408953233>.

Wikipedia, "High Availability," Jun. 9, 2011,<https://en.wikipedia.org/w/index.php?title=High_availability&oldid=433430281>.

Wikipedia, "ITIL," Jun. 30, 2011, <https://en.wikipedia.org/w/index.php?title=ITIL&oldid=437112064>.

* cited by examiner

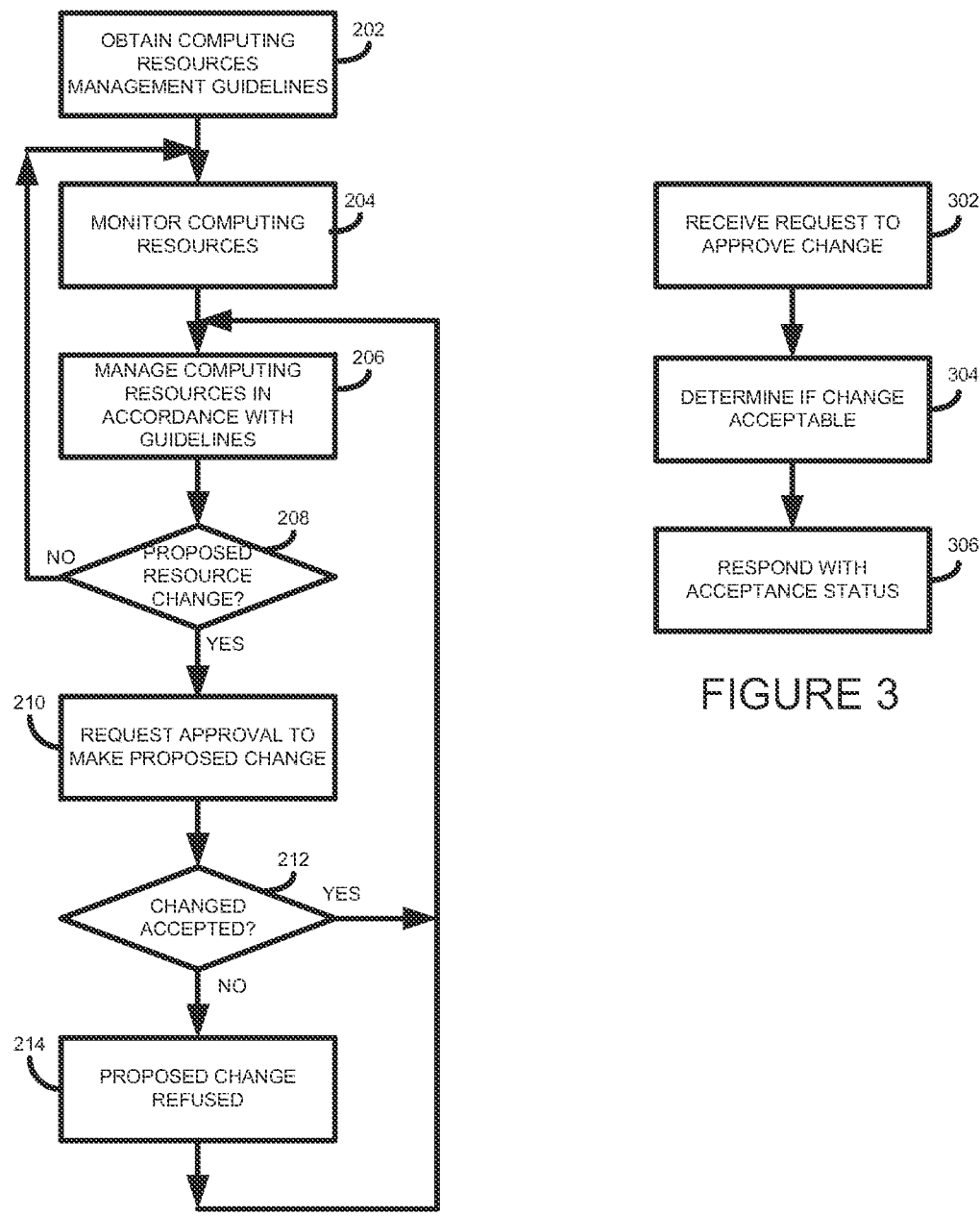

METHOD OF AND SYSTEM FOR MANAGING COMPUTING RESOURCES

BACKGROUND

Increasingly information technology (IT) service providers are offering services that make computing resources of their IT infrastructures available for use by remote clients over a suitable network. Such an approach is frequently referred to as cloud computing.

The computing resources that such cloud computing systems provide to clients may include both computing hardware and computer software resources, of both a physical and virtual nature. Cloud computing systems thereby enable clients to have access to computing resources, but without having the burden of having to manage, maintain, house, and pay for a large computing infrastructure. Furthermore, cloud computing systems generally enable the amount of computing resources provided to the client to be scalable based on the actual computing resources required by the client at any one time.

The computing resources, which may include resources such as computing hardware, software applications, storage equipment, network equipment, etc., used to provide a cloud computing system are typically housed in a service provider data center. Data centers are generally operated using a high level of automation. Such automation may include, for example, the use of virtualization techniques, archiving techniques, security techniques, redundancy techniques, and so on. Data center automation is generally performed in accordance with data center management guidelines defined by the data center operator.

When a client contracts with a service provider to use computing resources in a cloud computing system a service level agreement (SLA) is typically defined which details the computing resources requested as well as the agreed quality of service (QoS) to be provided by those computing resources. The service provider is thereafter contractually bound by the defined SLA.

Typically, a cloud computing service provider providers cloud computing resources to multiple clients, each of which may have their own individual SLAs, each of which may define a different QoS agreement.

BRIEF DESCRIPTION

Examples of the invention will now be described, by way of non-limiting example only, with reference to the accompanying drawings, in which:

FIG. 2 is a simplified flow diagram outlining an example method according to principles described herein;

FIG. 3 is a simplified flow diagram outline an example method according to principles described herein;

Figure 4:
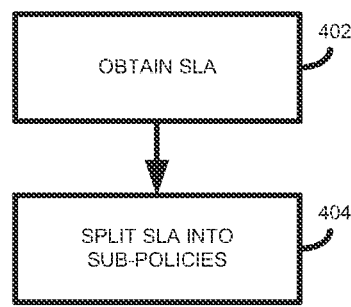
Figure 5:
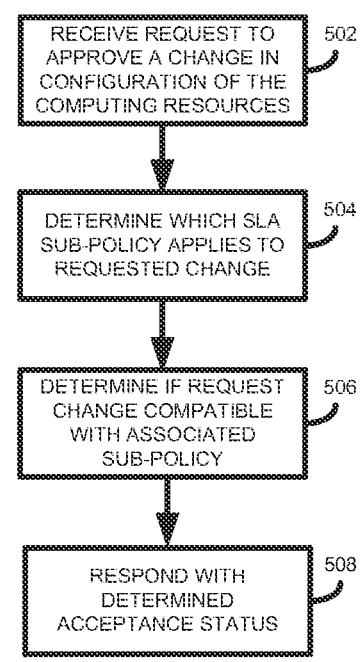
Figure 6:
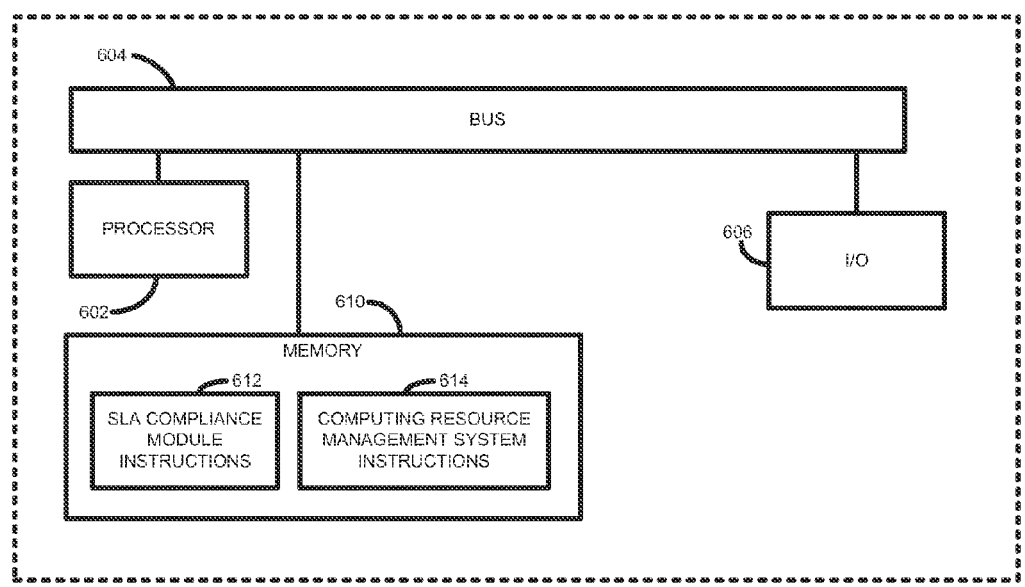

FIGS. 4 and 5, respectively, depict simplified block diagrams of an example implementation of part of a system according to an example of principles described herein;

FIG. 6 is a simplified block diagram of an example computing system according to an example of principles described herein.

DETAILED DESCRIPTION

Figure 1:
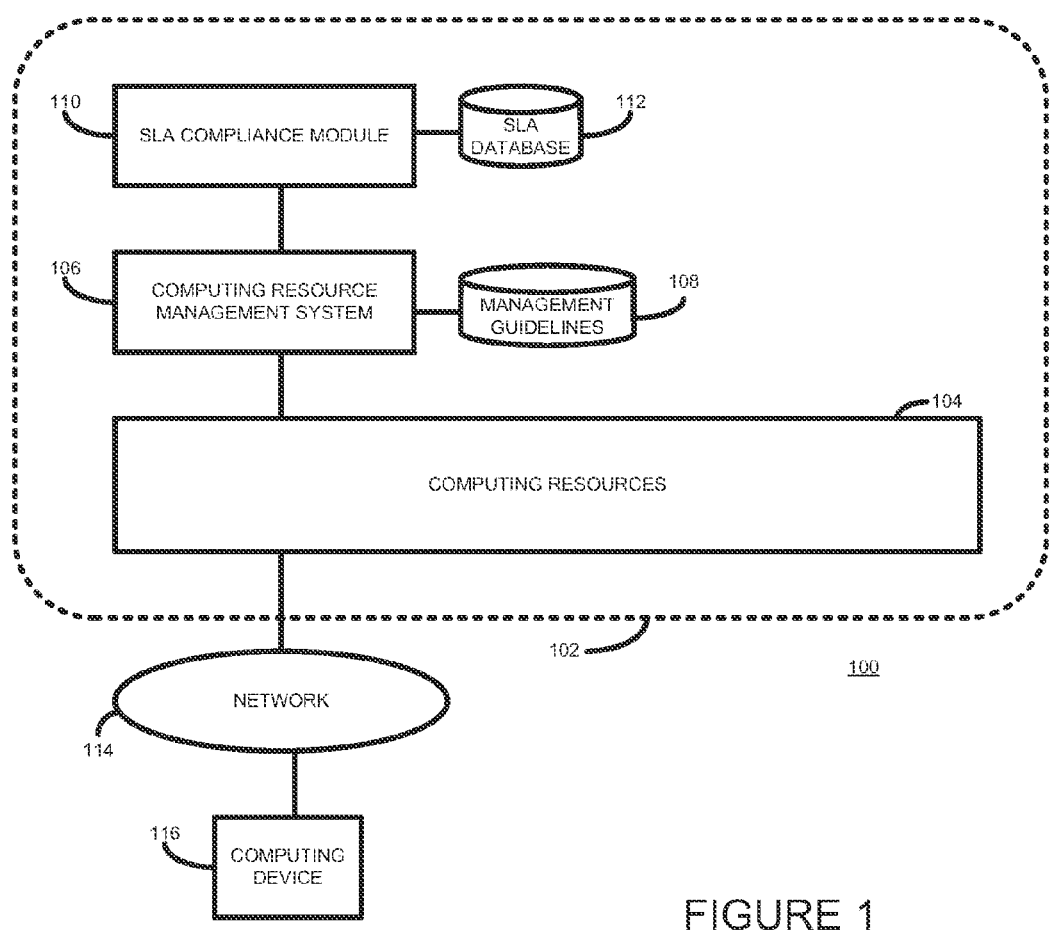
FIG. 1 is a simplified block diagram showing a system according to an example of principles described herein.

Referring now to FIG. 1 there is shown is a block diagram of a simplified computing system 100, such as a cloud computing system, according to an example of principles described herein. The computing system 100 includes a computing service provider system 102 that is used to provide remote computing services to one or multiple clients concurrently. A client user-interface may be provided, for example, using a computing device 116 via a network 114. The computing device 116 may be one of many computing devices in a client network (not shown). The computing device 116 may be any suitable computing device such as a desktop personal computer, a laptop computer, a smartphone, and the like.

Computing services that may be provided by the computing environment 102 may include computer processing resources, software applications, data storage, networking, and telecommunication services. The network 114 may be a public network, such as the Internet, or may be a private network.

The computing services provided by the computing system 102 are provided by a set of computing resources 104. The computing resources 104 may include both computing hardware and computer software. Examples of computing hardware include computing devices, computer servers, storage devices, memories, networking devices, and telecommunication devices. Examples of computer software include operating systems, data processing software, database software, office productivity software, graphics software, and so on. In one example the computing resources 104 are located in a data center. In a further example, the computing resources 104 are located in one or multiple data centers in one or multiple geographical locations.

The computing resources 104 are managed using a computing resource management system 106 in accordance with a set of management guidelines stored in a management guideline database 108. The management system 106 uses automation techniques to automate different operations of the management of the computing resources 104. Some examples of the type of operations that may be automated are described below.

Automated management of computer software may, for example, use so-called virtualization techniques. Using such techniques one or multiple virtual machines may execute on a computer server, and one or multiple software applications may execute on each virtual machine. As the usage of different ones or instances of the software applications changes over time, the management system 106 may modify the configuration of different ones of the computer resources 104. For example, the management system 106 may modify on which virtual machine a particular application is executed, may modify on which physical computer server a virtual machine (and the applications running thereon) are executed, and so on. This may be performed, for example, to enable a software application running on a lightly-loaded computer server to be moved to run on a different computer server, thereby allowing the original computer server to be shut-down. Conversely, the management system 106 may enable virtual machines and their respective software applications running on a highly-loaded computer server to be moved to run on a different computer server, thereby reducing the processing load on the original computer server. Such physical automation and virtualization lifecycle automation techniques enable virtual machines, and their software applications, to be moved from one physical machine and/or virtual machine to another with little or no disruption to the performance of the applications as they are used by remote clients.

Automated management may also provide for the automated provisioning of a redundant computing resource for high-availability purposes, for example to enable a software application to have a replicated but stand-by application running on a different computer server in case a problem occurs with the execution of the software application, or to instantiate replicated instances of the application and its associated resources in the same or a remote datacenter to service more client usage needs.

Automated management may also provide for the automated back-up or archiving of application data in a data vault or data store.

The management guidelines are defined by the operator of the service provider system 102. The guidelines may define, for example, the manner in which virtualization is performed, the manner in which data archiving is performed, the manner in which high-availability or redundancy is achieved, and so on.

For example, if the computing resources 104 are provided by two data centers located in two different countries, the management guidelines may define that software application data is to be archived in a data vault in a different geographical location to the where the application is running. Similarly, the management guidelines may define that a software application is replicated as a stand-by application in a data center in a different geographical location to provide high-availability of the software application.

Furthermore, the management guidelines may enable virtual computing resources to be moved between different non-virtual computing resources for example, to enable efficient power management of the non-virtual computing resources.

Being able to move software applications and application data around between different computing resources in different locations enables data center operators to operate their data centers efficiently, as well as providing a good level of resilience in case of failure of one or more computing resources.

However, when a cloud computing service provider offers cloud computing services to a client, the service level agreements defined for each client may add additional constraints to the way in which the computing resources 104 may be managed. In some cases, conflicts or incompatibilities may arise between the way in which the computer resource management system 106 manages the computing resources in accordance with the management guidelines 108 and the conditions detailed in a client SLA.

For example, a client SLA may prevent a computing resource from being moved to a data center in a different country due to data privacy legislation or other business restrictions. In another example, a client SLA may define a minimum amount of computer processor resources that are to be assigned to a particular client, whereas the management system 106 may automatically scale-down the resources allocated to a client if it determines that the client is not making using of those minimum computer processor resources. Such operations may, therefore, lead to the conditions of a client SLA being breached.

Examples of principles described herein, however, aim to provide a system and method that overcomes, or at least alleviates, such problems.

Operation of elements of the system of FIG. 1 will now be described with additional reference to the flow diagrams of FIG. 2 and FIG. 3.

At block 202 (FIG. 2) the computing resource management system 106 obtains a set of management guidelines stored in the management guideline database 108. At block 204 the computing resource management system 106 monitors characteristics of the computing resources 104. The characteristics that may be monitored may include, for example, the processor usage of a computing device, the memory usage of a computing device, the virtual memory usage of a virtual machine, the memory usage of a software application, the storage capacity of a computing device, the temperature of a computing device, the energy consumption of a computing device, and so on. The management system 106 may monitor the computing resources 104 in any appropriate manner. For example, the management system 106 may individually poll different ones of the computing resources to obtain monitored characteristics, may receive events or messages sent by different ones of the computing resources 104, and so on.

Based on the monitored characteristics the management system 106 manages (block 206) the computing resources in accordance with the obtained management guidelines.

In the present example, if the management system 106 proposes (block 208) to make a change to a characteristic of one of the processing resources 104 it sends a computing resource configuration change request (210) to an SLA compliance module 110 associated with automatable representations of the management guidelines 108. Examples of a computing resource configuration change may include a proposal to move a software application from one virtual machine to another virtual machine in real-time or in substantially real-time, to move a virtual machine from one computer server to another computer server, to power-down a computing device, and so on.

If the SLA compliance module 110 determines that the proposed configuration change is acceptable, for example if it determines that the conditions of an associated SLA stored in the SLA database 112 will be breached, the management system 106 receives a change acceptance message (212) and the management system 106 implements the change (206). If, however, the SLA compliance module 110 determines that the conditions of an associated SLA stored in the SLA database 112 will be breached the management system 106 receives a change refusal message (212) and the management system 106 does not make the proposed configuration change (214). In one example the management system 106 notifies the client, for example by sending an appropriate message, or by generating an appropriate alert, that the management system 106 prevented a requested computing resource configuration change from being made, in accordance with the management guidelines.

Operation of the SLA compliance module 110 will now be described in greater detail with addition reference to the flow diagram on FIG. 3.

At 302 the SLA compliance module 110 receives a computing resource configuration change request from the management system 106 to approve a change to be made to the configuration of a computing resource 104. At 304 the SLA compliance module 110 determines whether the requested configuration change is compatible with an associated SLA or SLAs stored in the SLA database 112. The received request may, for example, be in an XML or other suitable format that describes the nature of the proposed change. The SLA compliance module 110 may make the determination using appropriate data processing techniques, such as parsing, matching, searching, and so on. The status of whether the configuration change request is acceptable, or not, is returned to the management system 106 in a suitable message (306).

In one example, the SLA compliance module 110 may suggest, where it determines that a requested configuration change is not approved, to determine an alternative change that would satisfy the objectives of the original request as well as being compatible with one or more of the SLAs stored in the SLA database 112. This may be achieved, for example, by communicating with the management system 106 and having the management system 106 generate an alternative change request.

Referring now to FIGS. 4 and 5 there is now described a further example method of operating the SLA compliance module 110 according to principles described herein.

In this example the service provider 102 configures the computing resources 104 assigned to a single client in a segregated manner with respect to computing resources assigned to a different client. In this way, a first client may be assured that none of the computer resources 104 assigned thereto are used by, or are accessible to, any other client. Such an approach is important for security and business integrity reasons.

In one example, the resource management system 106 maintains a computing resource allocation database (not shown) that details which ones of the set of computing resources 104 are allocated to which client.

At block 402 (FIG. 4) the SLA compliance module 110 obtains an SLA stored in the SLA database 112. In one example the obtained SLA is a stored in an electronic readable format, for example using a suitable mark-up language such as XML.

In another example, the obtained SLA is stored in a natural language format, for example in a word processing document file. In this case, the SLA compliance module 110 performs a conversion of the natural language format SLA into a suitable electronic readable format. Conversion may be performed using any suitable techniques including, for example, parsing techniques, lexical analysis techniques, human operator assisted conversion techniques, and so on.

The obtained electronic readable SLA is analyzed by the SLA compliance module 110 and the SLA is split into one or multiple sub-policies. The number and type of each sub-policy depends on the content of the obtained SLA. For example, an SLA may include data or definitions of at least one of: an agreed availability policy; an agreed service policy; an agreed scaling policy; an agreed security policy; and an agreed continuity policy. Additional sub-policies may be present in other examples. Each sub-policy defines one or more agreed conditions or characteristics. For example, a scaling policy may indicate the maximum and minimum agreed amount of computing resources that may be assigned to a given client.

Each of the determined sub-policies corresponds to at least one computer resource management characteristic. For example, the computing resource management system 106 may manage the computing resources 104 using availability characteristics, service characteristics, scaling characteristics, security characteristics, continuity characteristics, and so on.

As the resource management system 106 manages the computing resources 104 it generates alerts based on the above-mentioned computer resource management characteristics. For example, if the resource management system 106 determines that a change in the number of computer servers currently operating is required, it may generate a suitable scaling alert. Similarly, if the computer resource management system 106 determines that a change in a security configuration is required, it may generate a suitable security alert. In one example the alerts generated include a description of the alert, for example using a suitable mark-up language. The alert description may include, for example, the nature of the request, the reasons for the request, the requested consequence of the request, and so on.

When the computing resource management system 106 generates an alert, as described previously with reference to FIG. 2, it requests (block 210), from the SLA compliance module 110, approval to make a computing resource configuration change.

In the present example, the SLA compliance module 110 receives (block 502, FIG. 5) the configuration change approval request.

At block 504 the SLA compliance module 110 determines which SLA sub-policy applies to the approval request. As previously mentioned, in the example where computing resources for different clients are segregated, the SLA compliance module 110 identifies, from the approval request, the computing resource concerned by the request, and is thereby able to identify which client is assigned to, or is associated with, the identified computing resource.

This determination may, for example, be made by performing a look-up or search using the computing resource identifier in the aforementioned computing resource allocation database.

Once the SLA compliance module has identified which client, and hence which SLA in the SLA database 112 is concerned by the computing resource configuration change request, the SLA compliance module 110 determines whether the received change request is compatible with the appropriate sub-policy of the identified SLA.

For example, if the SLA compliance module 110 receives a request to approve a computing resource configuration change to power-down a particular physical server assigned to a client, the SLA compliance module 110 determines (block 506), for example from the scaling sub-policy, whether the requested configuration change will result in a breach of the scaling sub-policy. For example, if a scaling sub-policy defines a minimum number of physical computer servers that are to be assigned to the client, the SLA compliance module determines whether the proposed powering-down of a physical server will bring the total number of physical servers assigned to the client below the minimum number defined in the scaling sub-policy.

In a further example, multiple clients may share some of the computing resources 104. In this case, the SLA compliance module 110 may determine (block 504) that multiple SLAs are potentially affected by a computing resource configuration change, and may consequently determine (block 506) whether the configuration change is compatible with any of the associated SLAs.

In a further example, as illustrated in FIG. 6, at least part of a service provider system 102, such as the SLA compliance module 110 and the computer resource management system 106, may be implemented using a computing system consisting of a microprocessor 602 coupled, via a communication bus 604, to a memory or storage module 610 and an input/output module 606. The memory or storage module 610 stores SLA compliance module instructions 612 and computing resource management system instructions 614. The instructions 612 and 614 are processor understandable instructions that when executed by the processor 602 provide functionality of a computing resource management system and an SLA compliance module as described herein.

It will be appreciated that examples and embodiments of the present invention can be realized in the form of hardware, software or a combination of hardware and software. As described above, any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape. It will be appreciated that the storage devices and storage media are examples of machine-readable storage that are suitable for storing a program or programs that, when executed, implement examples of the present invention. Examples of the present invention may be conveyed electronically via any medium such as a communication signal carried over a wired or wireless connection and examples suitably encompass the same.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention claimed is:

1. A method of managing a set of computing resources accessible to a client via a network, the method comprising:
   monitoring computing resources of the set of computing resources;
   managing the computing resources in accordance with a set of management guidelines;
   generating, based on the of monitoring and managing, a computer resource configuration change request, the computer resource configuration change request identifying a computing resource and a characteristic of the computing resource to be changed;
   identifying, from the identified computing resource, a client associated with the computing resource;
   determining whether the computer resource configuration change request is compatible with a service level agreement (SLA) associated with the identified client based on a correspondence between the characteristic and a sub-policy of a plurality of sub-policies in the SLA, the plurality of sub-policies corresponding to a plurality of characteristics of the computing resource; and
   authorizing or rejecting the computer resource configuration change request based on the determining.

2. The method of claim 1, further comprising, where it is determined that the computer resource configuration change request is not compatible with the SLA, rejecting the computer resource configuration change request.

3. The method of claim 1, wherein the set of computing resources includes physical and virtual computing resources.

4. The method of claim 1, wherein the SLA comprises at least one of: an agreed availability sub-policy; an agreed service sub-policy; an agreed scaling sub-policy; an agreed security sub-policy; and an agreed continuity sub-policy.

5. The method of claim 1 further comprising, maintaining a database of clients allocated to different ones of the set of computing resources, and identifying the client associated with the computer resource configuration change request by performing a lookup in the database using a resource identifier in the computer resource configuration change request.

6. The method of claim 1 further comprising, where it is determined that the computer resource configuration change request is not compatible with the SLA identifying an alternative change request that satisfies objectives of the computer resource configuration change request and is compatible with the SLA.

7. A non-transitory machine-readable medium that stores machine-readable instructions executable by a processor to provide a method of managing a set of computing resources, the tangible machine-readable medium comprising machine readable instructions that, when executed by the processor:
   receive, from a computer resource management system, a computer resource configuration change request generated by the computer resource management system based on monitoring computing resources and managing the computing resources in accordance with a set of management guidelines;
   identify, from the received computer resource configuration change request a computing resource identifier and a characteristic of the computing resource to be changed;
   identify, using the computing resource identifier, a client and a service level agreement (SLA) associated with the client, the SLA comprising a plurality of sub-policies corresponding to a plurality of characteristics of the computing resource;
   determine whether the received computer resource configuration change request is compatible with the SLA based on a correspondence between the characteristic and a sub-policy of the plurality of sub-policies; and
   approve or reject the received computer resource configuration change request based on the determining.

8. The non-transitory machine-readable medium of claim 7, further comprising machine readable instructions that, when executed by the processor:
   identify, using the computing resource identifier, a plurality of clients and associated client SLAs; and
   determine whether the received change request is compatible with each of the identified client SLAs.

9. The non-transitory machine-readable medium of claim 7, further comprising machine readable instructions that, when executed by the processor:
   identify, where it is determined that the computer resource configuration change request is not compatible with the associated SLA, an alternative change request that satisfies objectives of the computer resource configuration change request and is compatible with the associated SLA.

10. The non-transitory machine-readable medium of claim 7, further comprising machine readable instructions that, when executed by the processor:
    obtain the SLA; and
    process the SLA into one or multiple service level agreement sub-policies.

11. A computing system for managing computing resources of a set of physical and virtual computing resources to a remote client, the system comprising:
    a computing resource management system to generate a computing resource configuration change request based on monitoring the computing resources and managing the computing resources in accordance with a set of guidelines;
    a service level agreement (SLA) compliance module implemented by a processor to:
    receive, from the computing resource management system, the computing resource configuration change request comprising a characteristic of a computing resource to be changed;

identify, from the received computing resource configuration change request, the computing resource and a client associated therewith;

identify an SLA associated with the identified client, the SLA comprising a plurality of sub-policies corresponding to a plurality of characteristics of the computing resource;

determine whether the received computing resource configuration change request is compatible with at least one of the plurality of sub-policies comprised in the identified SLA based on a correspondence between the characteristic and the at least one sub-policy; and authorize or reject the received request based on the determining.

\* \* \* \* \*